(12) United States Patent
Marek et al.

(10) Patent No.: US 7,607,032 B1
(45) Date of Patent: Oct. 20, 2009

(54) POWER MANAGEABLE SCALABLE DISTRIBUTED MULTIPLE INDEPENDENT LEVELS OF SECURITY (MILS) COMPUTING PLATFORM

(75) Inventors: James A. Marek, Anamosa, IA (US); Steven E. Koenck, Cedar Rapids, IA (US); Julianne R. Crosmer, Cedar Rapids, IA (US); Allen P. Mass, Lisbon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 519 days.

(21) Appl. No.: 11/489,007

(22) Filed: Jul. 19, 2006

(51) Int. Cl.
*G06F 1/00* (2006.01)
*H04L 29/06* (2006.01)

(52) U.S. Cl. ............... 713/300; 713/150; 713/166; 713/190; 726/1; 726/2

(58) Field of Classification Search ............ 713/150, 713/164, 166, 182, 190, 300, 320; 726/1, 726/2, 3
See application file for complete search history.

(56) References Cited

U.S. PATENT DOCUMENTS 7,434,076 B1 * 10/2008 Altounian et al. .......... 713/324
7,469,338 B2 * 12/2008 Buer .......................... 713/170

OTHER PUBLICATIONS

Potlapally et al., A Study of the Energy Consumption Characteristics of Cryptographic Algorithms and Security Protocols, Feb. 2006, IEEE.*
Keeratiwintakorn et al., Energy Efficient Security Services for Limited Wireless Devices, Jan. 18, 2006, IEEE.*
Colon et al., Comparison of security protocols in Mobile Wireless Environments: Tradeoffs between level of security obtained and battery life, Sep. 9, 2005, IEEE.*
Prasithsangaree et al., Analysis of Tradeoffs between Security Strength and Energy Savings in Security Protocols for WLANs, 2004, IEEE.*
Potlapally et al., Analyzing the Energy Consumption of Security Protocols, Aug. 27, 2003, ISLPED'03.*

* cited by examiner

*Primary Examiner*—Mark Connolly
(74) *Attorney, Agent, or Firm*—Daniel M. Barbieri

(57) ABSTRACT

A multiple security level power managed processing system and method of managing power consumption in a multi security level system is disclosed. The system includes a plurality of nodes having a processor, associated memory and a processor interface. A plurality of processors individually may include multiple independent processing security levels, such as a first processing level and a second processing level. A MILS processor-to-processor network connects the plurality of processors. The system may be configured to distribute the application among the processing levels corresponding to a specific level of security. Power management profiles are used to control operation of the processors to maximize power efficiency while meeting security criteria.

21 Claims, 4 Drawing Sheets ated by reference in their entireties.
POWER MANAGEABLE SCALABLE DISTRIBUTED MULTIPLE INDEPENDENT LEVELS OF SECURITY (MILS) COMPUTING PLATFORM

CROSS REFERENCE TO RELATED APPLICATIONS

The present invention is related to U.S. patent application Ser. No. 11/340,096, entitled "Embedded MILS Network," sent via Express Mail Envelope Number EV 764 985 752 US, filed on Jan. 26, 2006 and United States Patent Application entitled "Scalable Distributed Software Defined Radio and Mission Computing Architecture," sent via Express Mail Envelope Number EV 764 985 443 US, filed on Jul. 19, 2006. Both of the aforementioned applications are hereby incorporated by reference in their entireties.

FIELD OF THE INVENTION

The present invention relates to the field of computing and more particularly to a system and method for improving power efficiency in a secure mobile processing environment.

BACKGROUND OF THE INVENTION

Power efficiency is extremely important in a mobile information processing environment. Mobile devices, including hand held platforms, typically have limited power sources such as batteries. At the same time, mobile information processing has become much more complex, which requires increasingly higher processor throughput. Security additionally is of prime importance in mobile processing environments, especially in military applications. Mobile system networks often have multilevel security (MLS) issues including secure processing tasks to be performed, lower security tasks to be performed, or unsecured tasks to be performed. Processor performance on mobile device systems may not be sufficiently high for intensive applications including communication, sensor data processing, and navigation, while meeting low power mobile device configuration requirements. Multiple level security issues may require mobile systems that are capable of reconfiguration to maximize throughput for the mix of secure and non-secure processing required. A challenge for utilizing multiple independent levels of security (MILS) computing and networking is the requirement to minimize power demands for the mobile devices. Network scalability may also present design challenges.

Distributed processing capability can be employed to address performance intensive applications. Utilizing distributed processing capability to maximize power efficiency can satisfy the processing demand, but it is must do so in a secure manner. Implementation of an operating system with a simplified kernel level control may minimize the processor power demand for a given operation. Implementation of MILS computing may mitigate security issues in a mixed security classification level network, but it may lead to increased mobile device power demands.

Therefore, it would be desirable to provide a system and method for managing power efficiency in a distributed processing environment that may include multilevel security.

SUMMARY OF THE INVENTION

Accordingly, the present invention is directed to a method and system for managing and minimizing power consumption in a distributed mixed security processing environment.

In a first aspect of the invention, a power management system is described. The system includes a plurality of processing nodes including a processor configured with a power consumption profile for managing the power consumption based on the processing capacity required for the application. A MILS processor-to-processor network interconnects the nodes. The system is configured to distribute an offloaded application from memory to other nodes based on the power requirement of the processor included in a node processing the offloaded application.

In a further aspect of the invention, a method of managing power consumption in a multilevel security processing network includes generating a power management profile including encoded processor security level data, distributing the generated power management profile to memory included in nodes for which the power management profile is to be used, and using the power management profile data to control the operation of the processor for maximum power efficiency while meeting security criteria.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
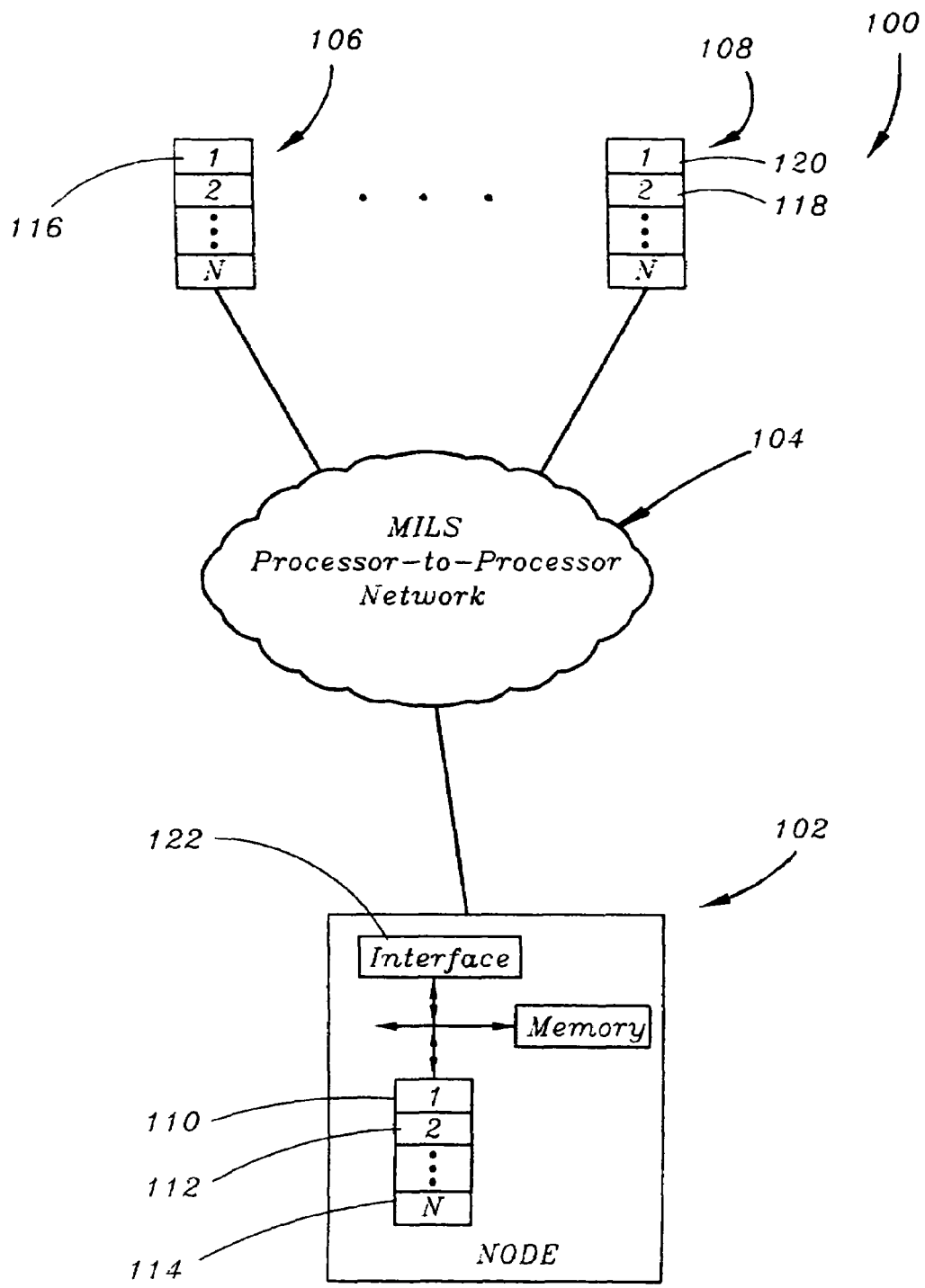
FIG. 1 is a diagrammatic view of a power managed processing system in accordance with the present invention.

Referring to FIG. 1, a multiple security level management processing system 100 is discussed. The system of the present invention may allow for distributed processing to occur over a local network of processing nodes while permitting integration with external communication facilities (indicated in FIG. 3). A system 100 in accordance with the invention may allow for efficient management of power consumption for processing tasks requiring varying processor capacity in a multiple level security (MLS) environment. The system 100 of the present invention includes security and power management, implementing a scalable processing architecture for applications in military or other environments where power management is required.

Wireless communication in a military setting requires the integration of many communication sources including mobile devices such as handheld platforms or the like to enable high portability. For example, personnel in remote areas often require devices that are easily carried on their person. Wireless communication may be obtained from various external sources, including fixed and mobile land based transmitters, satellites, airborne platforms, and the like. It is to be appreciated that these devices may utilize various portions of the electromagnetic spectrum to communicate. External communication networks allow personnel carrying out diverse tasks to communicate with each other. Providing widely available mobile communication is problematic as the users have different security requirements, as well as constrained power sources. System hardware and software architecture must ensure segregation of applications based on their respective security levels. In some instances, a communication point may require several levels of security to allow the relevant personnel to communicate. For example, a handheld communication device may communicate with a first remote source via unclassified communication and may then communicate with a second remote source via a secret or top secret communication.

Software defined radio (SDR) communication processing often requires high throughput to handle complex communication waveforms. Communication devices in these situations may also act as a convergence system, which may perform additional tasks having differing security requirements. Exemplary additional applications may include mission planning, sensor processing, navigation functions, and the like. The system and method of the present invention permit offloading of portions of the application to reduce processing overhead and direct more of the capacity of the processor toward execution of the application code.

Some processing tasks do not require high throughput. Low throughput tasks may waste energy in comparison to the application to be completed by using only a small portion of the processor's capacity for actual application processing, and utilizing the remaining portion simply idling or waiting for a stimulus event. A mobile device wasting power reduces the battery life of the device before recharging or battery replacement is required. In contrast to the present system 100, a previous device may expend power unnecessarily when running a simple application. This often occurs when devices are configured to have sufficient throughput to support the most complex and computationally demanding applications expected to be run. These high performance devices consume power rapidly and shorten the operational life of the device. The system 100 and method of the present invention minimize the power required to run each particular application by scaling the processing capacity to be just sufficient to meet the processing throughput demands of the application via a distributed computing architecture over a local MILS processor-to-processor network.

Figure 2:
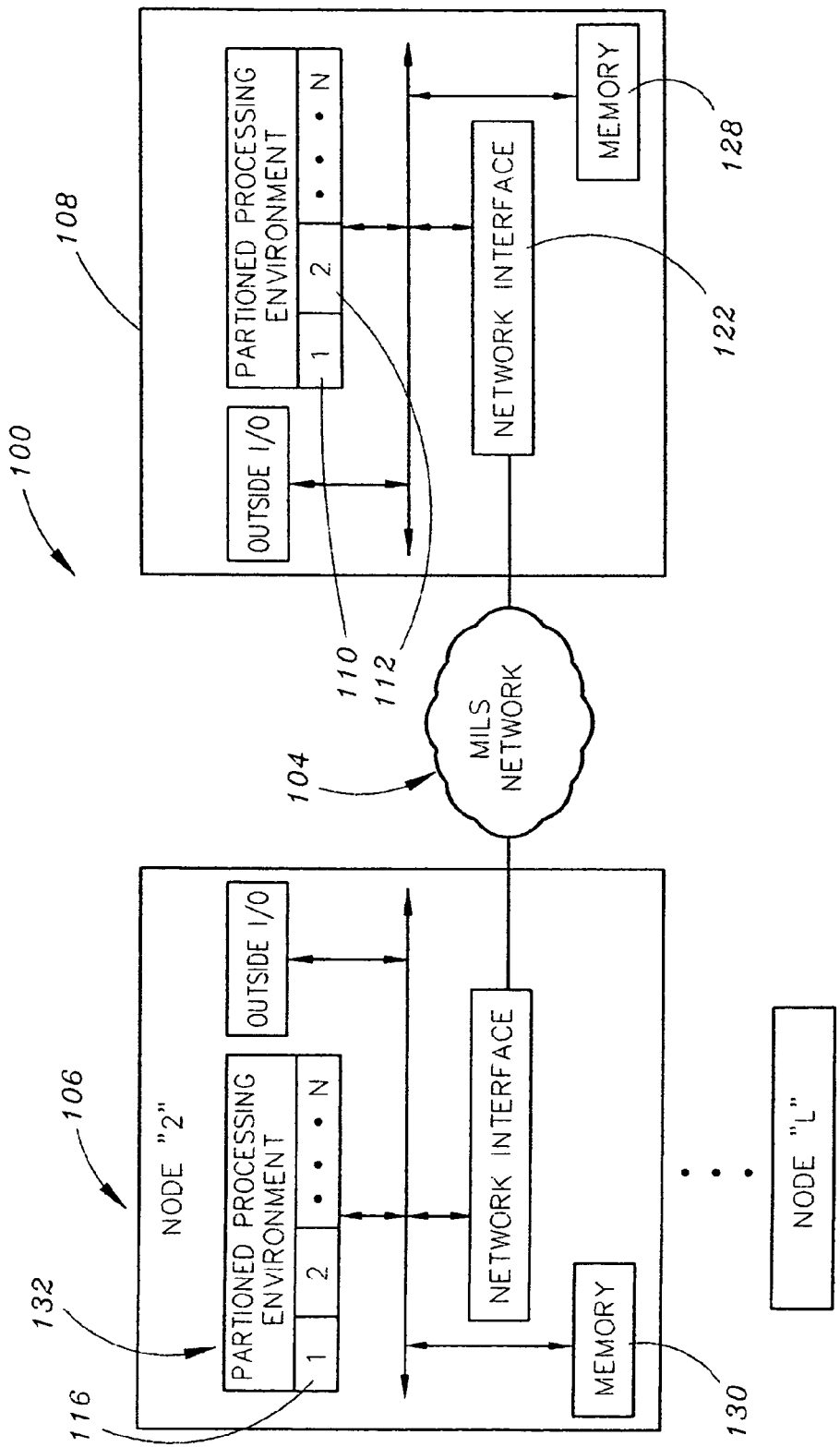
FIG. 2 is a more detailed diagrammatic view of a power managed processing system in accordance with the present invention.

Referring to FIGS. 1 and 2, in an exemplary embodiment, the system 100 includes a plurality of processors (three are indicated in the present example, a first processor 102, a second 106, and a third processor 108). One or more processing elements may be included in each of the processors 102, 106 or 108 as necessary to meet throughput requirements, promote scalability, provide redundancy, and the like. Commercial off-the-shelf processors may be utilized. The plurality of processors is communicatively coupled via the local MILS processor to processor network 104. In an exemplary embodiment, the MILS processor to processor network 104 may be an embedded switched fabric local area network. The system 100 promotes efficient processing by offloading selected computationally intensive software functions to maximize overall processing performance. Computationally intensive portions of communication transports may be distributed from memory over a processor-to-processor I/O (input/output) interface to memory in other nodes for processing, thereby permitting the utilization of more power efficient processors. The foregoing may increase power efficiency while maintaining throughput for computationally intensive applications and minimizing the processing overhead in the transferring node. Processor security level communication separation may be achieved by offloading processes into memory associated with a particular processor security level. While a multiple level security system is described, the principles of the present invention may be applicable to a system operating with one processing security level environment. Hardware routing tables associated with a particular processing security level provide communication path information to enforce separation and ensure that processes are offloaded to hardware having the correct processing security classification level. For example, the routing table directs data to memory associated with node 2 from node 1.

Static or dynamic scaling may be applied to various processors, processor security levels, or to all the processors included in the system. In either instance, the individual processors may have different processing capability allocation than the overall system or have differing allocations in comparison to the other processors. Allocation of processing resources by the processing security levels may be achieved by the partitioned hardware sharing the processor in a time division multiplexed manner. Additionally, removal of a node due to damage, failure or the like may be compensated by reallocation of the included processor through profile registers or memory associated with the included processing security levels. Power management profile registers may be maintained in memory to efficiently manage power consumption. For example, each of the processing levels "1" through "N" includes a power management profile in associated memory for managing processor power consumption for the partition. Reconfiguration of processor resources through, for example, scaling voltage levels and clock frequency management, may be achieved through the utilization of a power management profile message scheme including encoded processing security level data to ensure separation and prevent a lower processor security level from varying the power management of a higher processor security level. For example, processor voltage and frequency scaling profiles maintained in a memory are implemented to reduce the power and performance to that which is required for the application and thus reduce power consumption. In another example, power management profiles including processor voltage profiles and frequency scaling profiles may be included in one or more processors or processor levels. These profiles may be dynamic or static. In the current embodiment, each partitioned portion includes a power management profile. In other embodiments, each processor may have a single power management profile.

Communication between processing nodes may be accomplished by one or more network communication technologies. In an exemplary embodiment, communication between processors is conducted over a low power processor-to-processor communication network relative to the processor power consumption, so the power saving achieved through the distributed computing is not offset by communication power demands. Those of skill in the art will appreciate that communication may occur utilizing a wide variety of technological means implementing wired or wireless connections, in accordance with a wide variety of communication standards.

Referring to FIG. 2, communications are forwarded from a first node 108 via network interface 122 over a MILS processor-to-processor local low power network into memory 130 associated with a second node 106. This may occur without having to execute an operating system (OS) kernel level call in the processors of either node, thus relieving a computing demand on each of the transferring processors. Other processing tasks may be distributed from a node to equivalent processor levels in other nodes in a substantially similar manner. In an exemplary embodiment, the top processing demand determines if the application exceeds a throughput threshold level. If the throughput requirements demand greater processing capacity, the application is distributed from memory via the processor-to-processor interface 122 to other nodes with appropriate security classification for processing. The interface may be formed of partitioned processor block hardware and software or be implemented in a separate network interface card.

Messaging including processor security level data may be utilized to initiate changes to the power management profiles for the processors within the system. For example, a multiple bit classification code corresponding to a processor security level is included with a power management change request message to prevent power management changes from being implemented from a lower processor level to a higher processor level. The MILS separation system implementation must support the highest processor level, e.g., "Top Secret", while managing power consumption. Dedicated hardware and software resources enforcing MILS separation may be utilized.

An individual processor is configured with independent partitioned processing levels. For example, the AAMP7G processor manufactured by Rockwell Collins, Cedar Rapids, Iowa implements a National Security Agency (NSA) certified brick wall Partition Management Unit (PMU) to enforce separation. The processor architecture is configured to enforce separation to ensure compliance with security level requirements while also implementing power management. For instance in FIG. 1, the first processor node 102 includes a first processing security level 110, a second processing security level 112, which is different from the first processing security level. The processor node 102 may include a block of hardware with corresponding software for forming a MILS processor-to-processor interface 122 for communicating with other processor nodes to offload high level application software to maximize processor performance in a distributed manner. Additional processing security levels may be included in the processor node 102 through "N" processing security levels 114. The first processing security level 110 may be reserved for top secret applications (those having the highest level of security for the system 100); while the second processing security level may be implemented for unclassified communications and processing. In an exemplary embodiment, the processor partitions may allow for processor sharing in a time division multiplexed (TDM) manner. Other processing security levels may be implemented based on the system requirements. For instance, three processing levels, such as top secret, secret, and unclassified may be included in a processor. Each security level must be logically partitioned from the other security levels and implement an independent operating environment. Additional partitions may be included within a security level. For instance, a top secret security level may be divided into an "A" portion and a "B" so that independent tasks can be conducted while enforcing separation between the portions included in the security level. In the previous example, the "A" portion is capable of handling SDR communication while the "B" portion handles mission planning tasks. In this manner, separation exists to ensure that security between the tasks is not compromised. Independent separation may also be achieved through the implementation of a real time operating system (RTOS) having a small kernel. In the foregoing example, each of the processing security levels utilizes simplified kernel level software, in comparison to widely available OS platforms (which are configured to accomplish a wide variety of tasks), thus minimizing the respective processing capacity needed for each processing security level. In an exemplary embodiment, the kernel software programmed on each particular processing security level is independent of kernel software for every other processing security level. Processor security level separation is guaranteed through the utilization of a partitioned processor with temporal separation occurring in accordance with TDM methodology and spatial separation occurring in accordance with memory access enforcement. For instance, a partition management unit (PMU) is implemented to enforce process separation. A PMU prevents an improper operation within one partition from impacting other non equivalent partitioned portions. In an exemplary embodiment, the processors (102 through 108) support the Object Modeling Group (OMG) common object request broker architecture (CORBA) standard for networking applications over the network 104. Utilization of a MILS embedded hardware-based network routing scheme permits scaling of processing capacity while ensuring separation compliance.

Individual processors may be configured to address differing security level applications in a distributed manner to maximize power efficiency. For example, a distributed system 100 in accordance with the present invention may implement a processor having lower power demands in comparison to previous systems that implemented a processor having a throughput gauged to meet or exceed the requirements mandated by the most complex expected application. Previous system implementations have typically included processors that far exceed the actual processing capacity required to meet the most intensive task. In general, these systems exhibit poor power efficiency unless the application demands the full capacity of the processor. In the current invention, the processing capacity may be scaled to meet the demands of high throughput applications with relatively higher power consumption. For less processor intensive applications, the processing capacity may be scaled downward to perform the required computing tasks with relatively lower power consumption.

The system 100 promotes reconfiguration for the application to be processed while ensuring MILS separation required for United States Department of Defense (DoD) requirements. For example, while the first processor 102 and the second processor 106 are fully loaded meeting the requirement for a top secret communication (via processing security levels "1" 110 and 116, respectively in the first and second processors) the third processor 108 is available for unclassified application handling in processing security level "2" 118 or is implemented in a mixed fashion by implementing processing security levels "1" 120 and "2" 118. The plurality of processors is capable of reconfiguration and reallocation of resources to handle the processing task at hand in a power efficient manner. In another example, the first processor 102, the second processor 106, the third processor 108 and further included processors are reallocated such that appropriate processing security levels in all processing nodes are utilized for an unclassified application.

Figure 3:
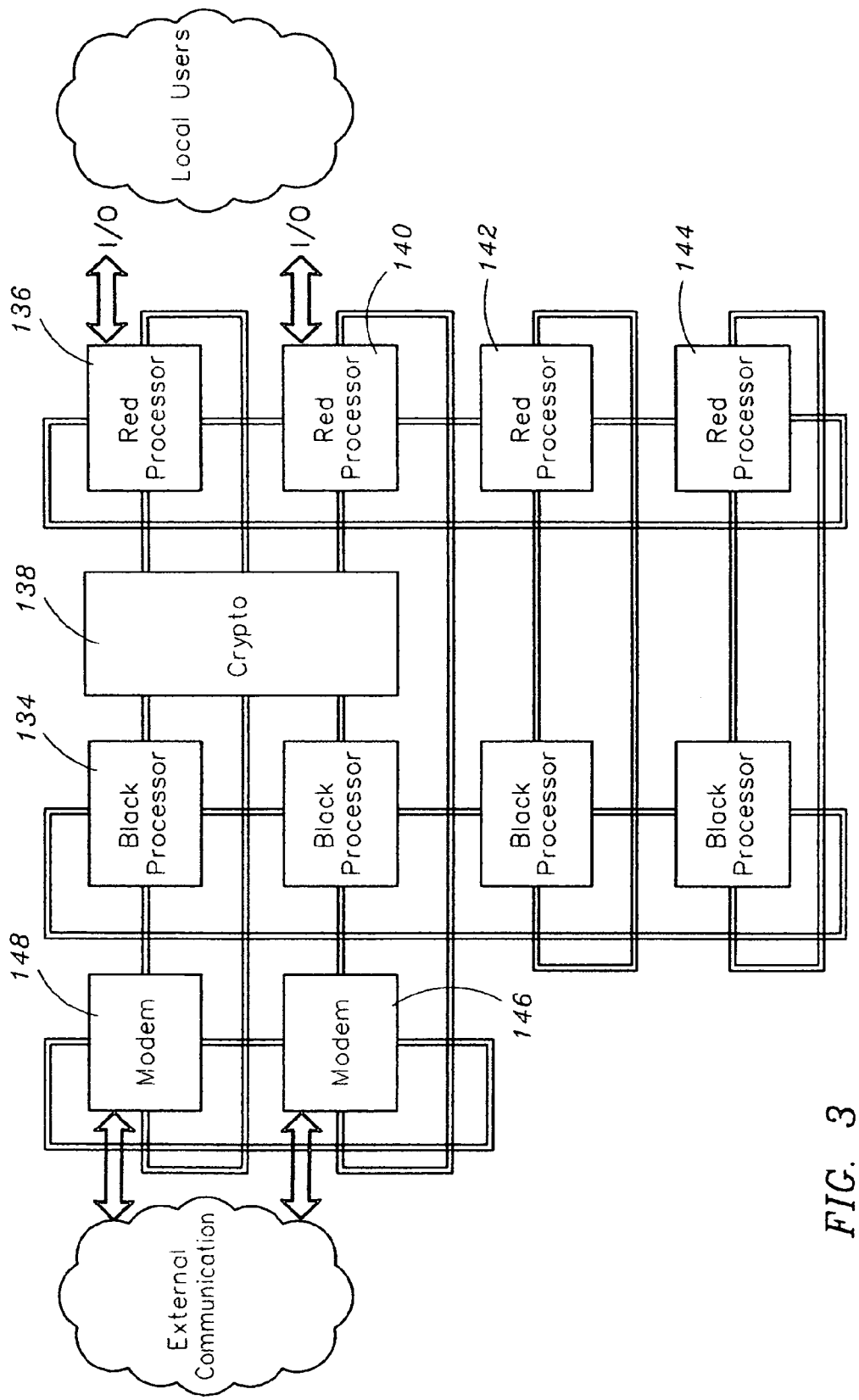
FIG. 3 is a block diagram of a communication processing environment including a cryptographic module.

Referring now to FIG. 3, in a further embodiment, a cryptographic module 138 is included with a plurality of processing modules for encrypting communications for transmission over an external network. Unclassified communication is transmitted without encryption to enable efficient data handling for large amounts of communications that do not include sensitive information. Communication of classified information is encrypted to ensure protection of sensitive information. In the present aspect, a MILS individual processor includes a red processor 136 for handling classified processes and a black processor 134 for handling unclassified or encrypted processes. Black (unclassified or encrypted) and red (classified) processes and information may be supported by a single processor with an appropriately designed and certified PMU operating to enforce separation. Communication between the unclassified processor and other processing security levels having the same "unclassified" level of security, included on other processors, occurs without any encryption. Communicating unclassified data via non-encrypted communication may permit increased communication efficiency including power management as the information is passed without encrypting and decrypting the passed data. Processing capacity may be scaled based on the application, for example, red processors 136, 140, 142, and 144 are implemented in a scaled fashion to address various levels of processing intensive applications. The external communications are typically wireless communication waveforms and are interfaced by modems 146 and 148 that perform digital filtering, demodulation and other signal processing operations. Multiple modems may be used to implement SDR channels and provide redundancy.

Figure 4:
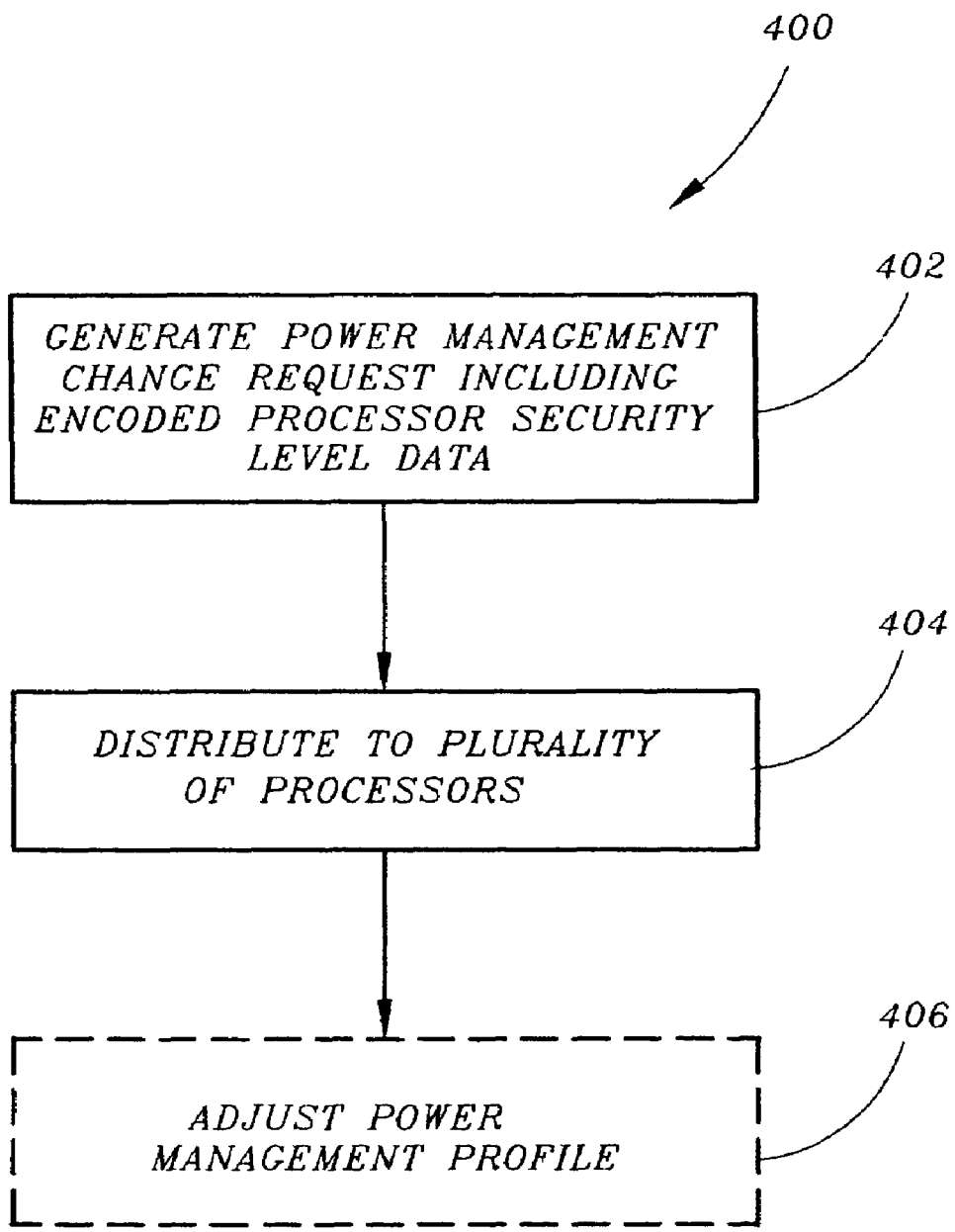
FIG. 4 is a flow diagram illustrating a method of dynamically managing power consumption in a multilevel security processing network.

Referring to FIG. 4, a method 400 of dynamically managing power consumption in a multilevel processing network is described. The method 400 includes generating a power management change request 402 including encoded processor security level data. For instance, a two bit encoded field corresponding to a specified processor security level is included with data for updating a power management register for dynamic power management scaling. In the present embodiment, the process operating at the highest processing security level or a MLS process generates the profile change. In further embodiments, processes at other security levels may generate profile changes for processes operating at the same or lower security levels. Power management profile changes may also be made for an entire processor. The change request may be forwarded to memory associated with all of the independent processing levels corresponding to the encoded processor security level data or to a subset such as all the nodes to which an application is forwarded. At step 404, the power management change is distributed via associated memory to a plurality of processor levels corresponding to the encoded processor level. The processors include processing levels which may be separated by a PMU to enforce separated processing to prevent data from being handled by a processing level which does not correspond to the encoded level. Distribution of the change request is performed based on the power requirement of the offloaded application or based on the availability of a node. In the foregoing manner, the capacity of the relevant processors is updated for the application or applied to account for an unavailable node. In an exemplary embodiment, a processor-to-processor network interface is implemented to forward the profile change to the corresponding processing levels. At step 406, the power management profile for each of the plurality of processors is adjusted and execution proceeds with the new settings.

It is understood that the specific order or hierarchy of steps in the methods disclosed are exemplary approaches. Based upon design preferences, it is understood that the specific order or hierarchy of steps in the method may be rearranged while remaining within the scope of the present invention. The accompanying method claims present elements of the various steps in a sample order, and are not meant to be limited to the specific order or hierarchy presented.

It is believed the method and system of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described is merely an explanatory embodiment thereof. It is the intention of the following claims to encompass and include such changes.

What is claimed is:

1. A distributed power management processing system, comprising:
   a plurality of nodes, an individual node of the plurality of nodes including:
     a processor having a processing capacity, the individual node of the plurality of nodes being configured with a power management profile for variably controlling power consumption of the processor based on the processing capacity required to perform an application; and
     a memory communicatively coupled to the processor, the memory being configured for accepting an offloaded application for communication to other nodes included in the plurality of nodes; and
   a network communicatively coupling the plurality of nodes, the network implementing MILS processor to processor communication,
   wherein the power management system is configured to distribute the offloaded application among the plurality of nodes based on the power management profile of individual processors included in the plurality of nodes running the offloaded application.

2. The system of claim 1, wherein individual nodes in the plurality of nodes dynamically pass power management profile messages among the other nodes within the plurality of nodes.

3. The system of claim 1, wherein the power management profile is stored within a register of the node.

4. The system of claim 1, wherein the processor is partitioned into a plurality of independent processing levels.

5. The system of claim 4, wherein an individual processor is configured with separate kernel level software for each independent processing level.

6. The system of claim 4, wherein individual nodes, in the plurality of nodes, are configured to dynamically pass power management profile messages including encoded data corresponding to an independent processing level included in the plurality of independent processing levels.

7. The system of claim 1, wherein the system is configured to support software defined radio.

8. The system of claim 1, wherein an individual processor is configured to support a common object request broker architecture (CORBA) application program interface.

9. The system of claim 1, wherein an individual node in the plurality of nodes is included in a mobile device.

10. The system of claim 1, wherein the power management profile includes at least one of processor voltage level or processor clock frequency.

11. A power managed processing system, comprising:
    a plurality of nodes, an individual node of the plurality of nodes including:
      a processor having a processing capacity an individual node of the plurality of nodes being configured with a power management profile for variably controlling power consumption of the processor based on the processing capacity required to perform an application, the processor being configured with an interface for passing data to other nodes included in the plurality of nodes; and a memory communicatively coupled to the processor interface, the memory being configured for accepting an offloaded application for communication to other nodes included in the plurality of nodes; and a network communicatively coupling the processor interface to the other nodes included in the plurality of nodes, the network implementing MILS processor to processor communication, wherein the power management system is configured to distribute the offloaded application among the plurality of nodes based on the power management profile of individual processors included in the plurality of nodes running the offloaded application.

12. The system of claim 11, wherein individual nodes in the plurality of nodes dynamically pass power management profile messages among the other nodes within the plurality of nodes.

13. The system of claim 11, wherein the power management profile is stored within a register of the node.

14. The system of claim 11, wherein the processor is partitioned into a plurality of independent processing levels.

15. The system of claim 14, wherein an individual processor is configured with separate kernel level software for each independent processing level.

16. The system of claim 14, wherein individual nodes in the plurality of nodes are configured to dynamically pass power management profile messages including encoded data corresponding to an independent processing level included in the plurality of independent processing levels.

17. The system of claim 11, wherein an individual processor is configured to support a common object request broker architecture (CORBA) application program interface.

18. The system of claim 11, wherein an individual node in the plurality of nodes is included in a mobile device.

19. The system of claim 11, wherein the power management profile includes at least one of processor voltage level or processor clock frequency.

20. A method of dynamically managing power consumption in a multilevel processing network, comprising:

generating a power management profile change including encoded processor security level data;

distributing the generated power management profile change to memory included in nodes including the processor for which the power management profile is to be changed, wherein the encoded processor security level data includes two bits of processor level data.

21. A method of dynamically managing Dower consumption in a multilevel processing network, comprising:

generating a power management profile change including encoded processor security level data;

distributing the generated power management profile change to memory included in nodes including the processor for which the power management profile is to be changed, wherein the power management profile change is generated by the highest processor security level included in the multilevel processing network.

* * * * *